Patented July 29, 1924.

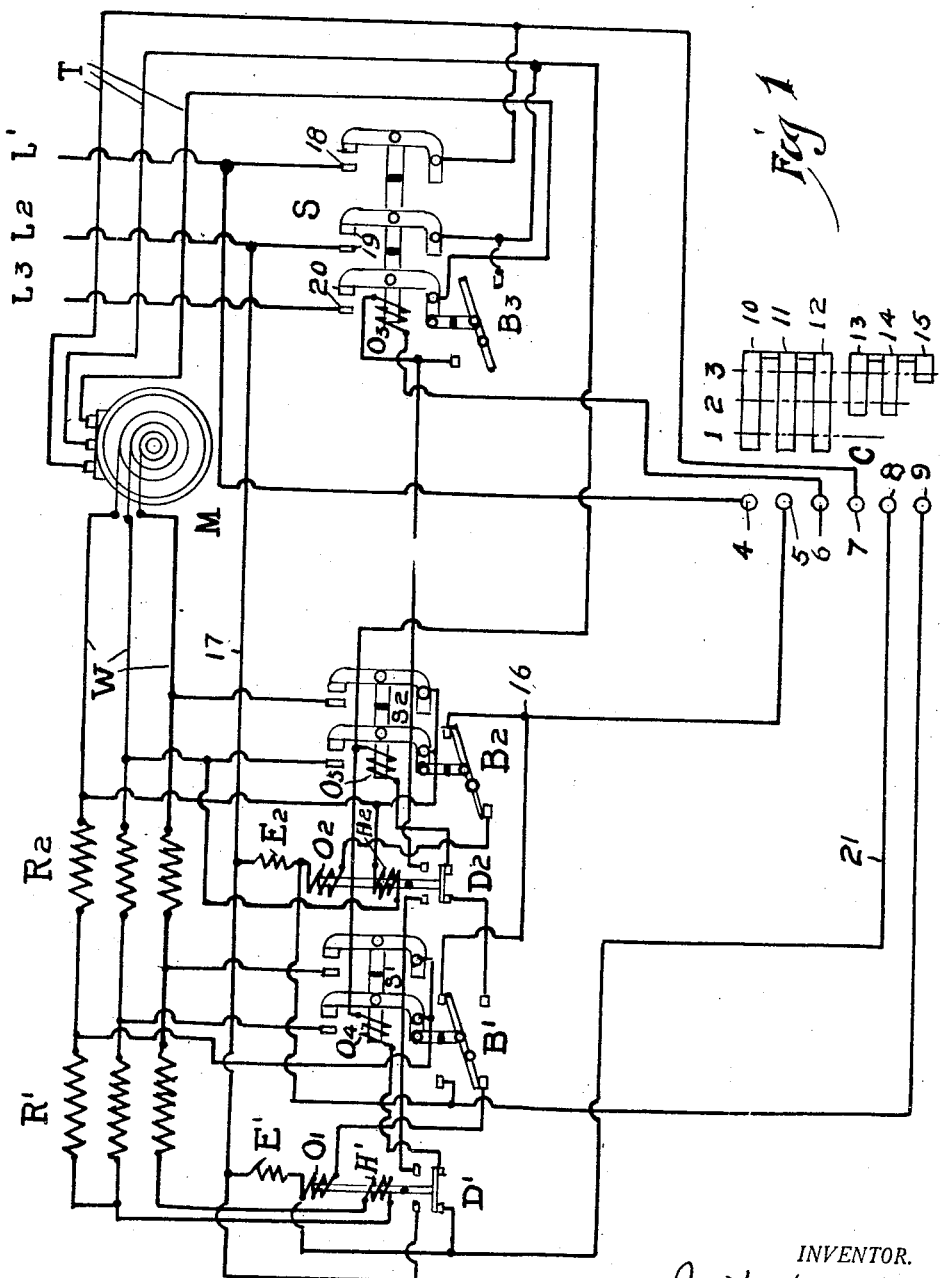

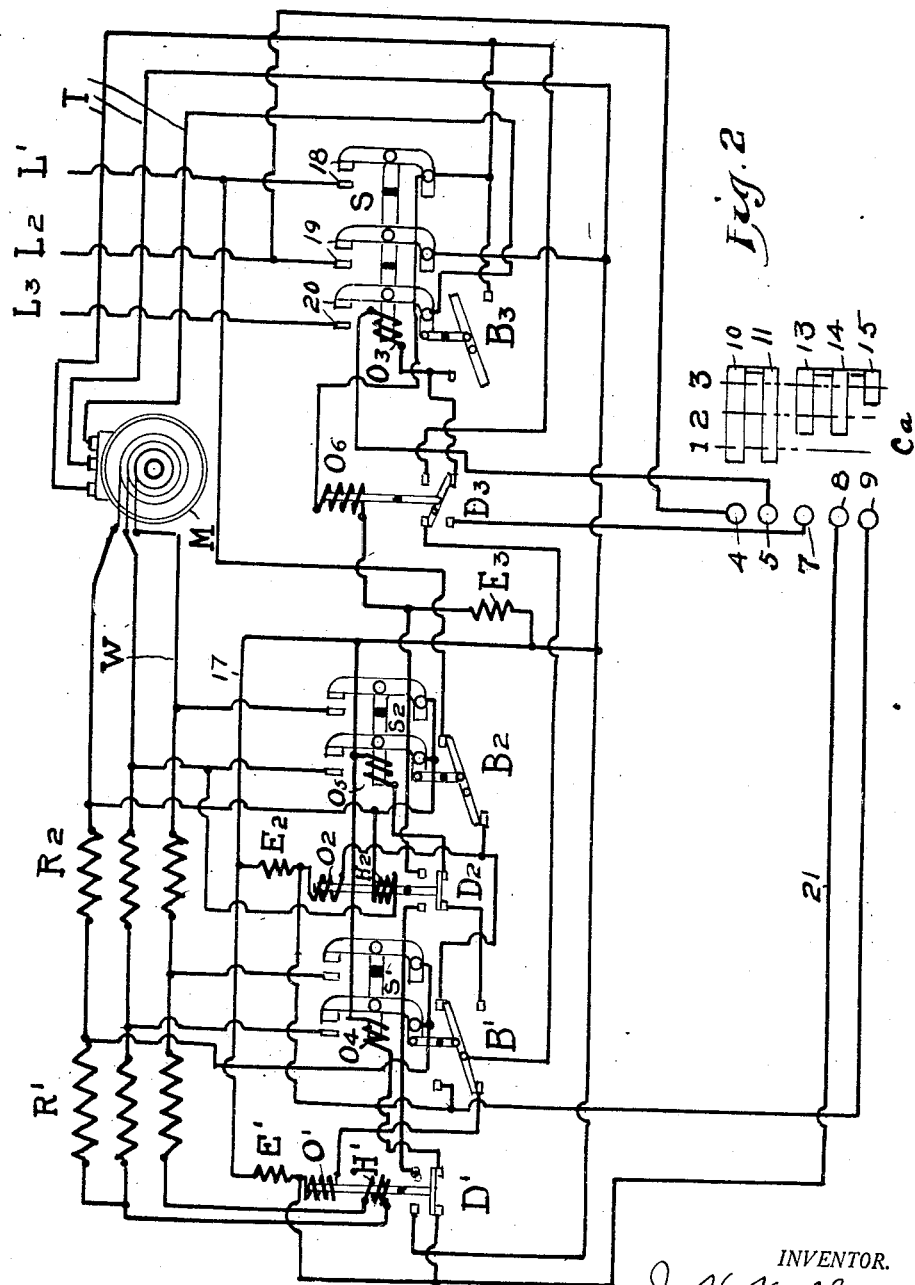

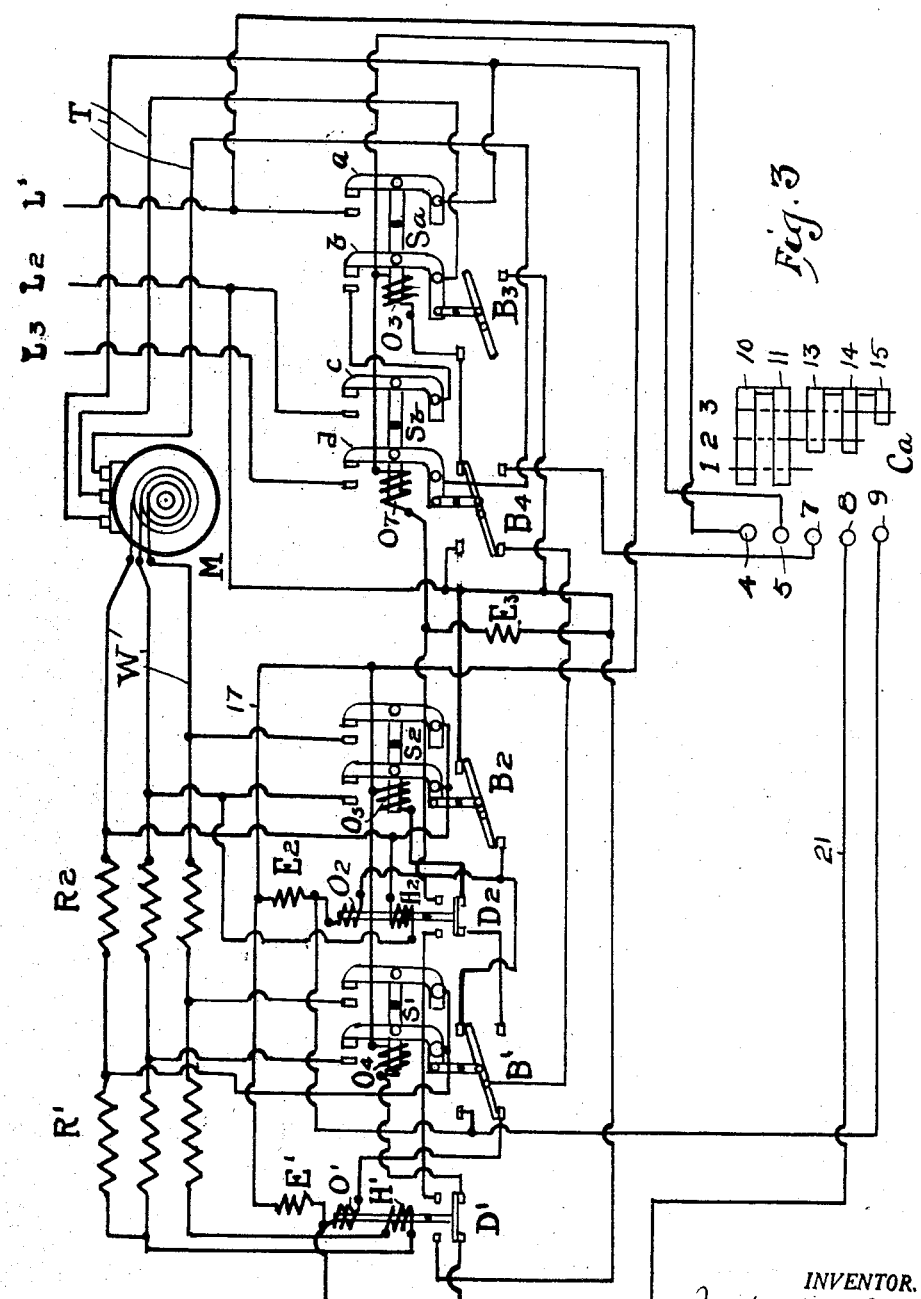

1,503,156

UNITED STATES PATENT OFFICE.

JAY H. HALL, OF CLEVELAND HEIGHTS, OHIO, ASSIGNOR TO THE ELECTRIC CONTROLLER & MANUFACTURING COMPANY, OF CLEVELAND, OHIO, A CORPORATION OF OHIO.

MOTOR-CONTROL SYSTEM.

Application filed July 13, 1922. Serial No. 574,747.

*To all whom it may concern:*

Be it known that I, JAY H. HALL, a citizen of the United States, residing at Cleveland Heights, in the county of Cuyahoga and State of Ohio, have invented new and useful Improvements in Motor-Control Systems, of which the following is a specification.

My invention relates to motor control systems. One object of this invention is to provide a motor control system in which the motor controlling resistances are cut out by switches controlled by relays having an operating winding with means for shunting the operating winding when the holding winding has been properly energized in order that the relay may be under the control of the holding winding only, which permits the relay to be released when the motor current reaches a predetermined value. My invention contemplates also the employment of two or more of such relays for the control of resistances used in accelerating motors. Another object is to effect the energizing of the operating windings of the resistance switches and the de-energizing of the operating winding of the relays by the use of a single master switch contact without danger of the release of the relay before the holding winding becomes effective. These and other objects will be better understood from the detailed description following.

The accompanying drawings show diagrammatically three of the many ways in which my invention may be incorporated in a motor control system.

Referring to the accompanying drawings, Fig. 1 is diagrammatic view illustrating one species of my invention; Fig. 2, a diagrammatic view of a second species thereof; and Fig. 3, a diagrammatic view of a third species thereof.

Referring first to Fig. 1, M designates a slip-ring induction motor, controlled by the master switch C, the main switch S, and the groups of resistances $R^1$ and $R^2$, the latter being controlled by the auxiliary or acceleration switches $S^1$ and $S^2$ which are under the control of the relays $D^1$ and $D^2$. $O^1$ and $O^2$ are the operating windings for the relays, and $H^1$ and $H^2$ are the holding coils therefor, the latter being controlled by the secondary circuit W of the motor, the former by the motor supply circuit having the supply lines $L^1$, $L^2$ and $L^3$. The operating windings are not in series with the starting resistances but are connected in shunt with the motor circuit.

When the master switch C is moved to position 1 the relay windings are energized by current passing from the supply line $L^1$ through the fingers 4 and 5 and the contact strips 10 and 11 of the master switch C to the point 16 where the circuit divides, one branch including the switch $B^1$, the winding $O^1$ and the resistance $E^1$, and the other branch including the switch $B^2$, the winding $O^2$ and the resistance $E^2$. The resistances $E^1$ and $E^2$ are connected to the wire 17 which leads to the supply wire $L^2$. The current in the windings $O^1$ and $O^2$ causes the relays $D^1$ and $D^2$ to be operated to close their upper contacts, thereby connecting the wire 17 to the operating winding $O^3$ of the main switch S and thence to the contact finger 6 and contact strip 12 of the master switch C. The current in the winding $O^3$ causes the switch S to close its three contacts 18, 19 and 20, thereby connecting the supply lines $L^1$, $L^2$ and $L^3$ to the primary circuit T of the motor M, whereupon the secondary circuit W of the motor becomes energized, the latter supplying current to the holding windings $H^1$ and $H^2$. Furthermore, the closing of the switch S operated the switch $B^3$ to include the winding $O^3$ in a maintaining circuit between the lines $L^1$ and $L^2$ by way of the fingers 4 and 6, and the strips 10 and 12, and the contacts 19.

When the switch C is moved to position 2, the fingers 7 and 8 are engaged with the contact strips 13 and 14, and the winding $O^1$ is shortcircuited by the wire 21, the fingers 7 and 8, the contact strips 13 and 14, and the contacts 18 of the switch S through fingers 4 and 5, and the strips 10 and 11. The relay $D^1$ is now under the control of the holding winding $H^1$ only; and as soon as the current in this winding diminishes to a predetermined value, the relay $D^1$ is released whereupon it opens its upper contacts and closes its lower contacts. The closure of these contacts connects the operating winding $O^4$ of the switch $S^1$ between the lines $L^1$ and $L^2$ by way of the contacts 18, the fingers 7 and 8, the strips 13 and 14, the wire 21, the lower contacts of the relay $D^1$, and the contacts 19. Current in the winding $O^4$ closes the switch $S^1$ which shortcircuits the resistances $R^1$. The switch $S^1$ also operates the switch $B^1$ which connects the finger 9 to one of the lower contacts of the relay $D^2$, and opens the contacts through which current was supplied to the winding $O^1$.

When the master switch C is moved to position 3, contact finger 9 is engaged by the contact strip 15, whereby connection is made to the upper end of the winding $O^2$ from line $L^1$ and shortcircuits the same. This places the relay $D^2$ under the control of the holding winding $H^2$ only. When the motor speed increases so as to reduce the current in its secondary circuit to a predetermined value, the holding winding $H^2$, which is shunted across one phase of the secondary, releases the relay $D^2$, the latter opening its upper contacts and closing its lower contacts. The closing of the lower contacts connects the operating winding $O^5$ of the switch $S^2$ in circuit with the lines $L^1$ and $L^2$ by way of the contacts 18, the fingers 7 and 9, the strips 13 and 15, the switch $B^1$, the lower contacts of the relay $D^2$, and the contacts 19 of the switch S. The current in the winding $O^5$ closes the switch $S^2$ which shortcircuits the resistances $R^2$ and opens the switch $B^2$.

If the master switch C is moved back to position 2, the circuit of the winding $O^5$ is opened at the finger 9, and the switch $S^2$ opens and operates the switch $B^2$ to close the circuit of the winding $O^2$, the resistances $R^2$ being restored to the motor circuit, and the relay $R^2$ being lifted so as to open its lower contacts. If the switch C is now moved to position 3, the relay $D^2$ will be put under the sole control of the winding $H^2$ as before and the relay $D^2$ and the switches $S^2$ and $B^2$ will operate as before when the current in the winding $H^2$ drops to the predetermined value. In case the master switch is moved from position 3 to position 1, both the switches $S^1$ and $S^2$ will open and both relays $D^1$ and $D^2$ will be lifted and held up until the switch C is moved to position 2 or 3, or the switch C is opened.

The main switch S cannot close until both relays are lifted to open the circuits of the windings $O^4$ and $O^5$, and the relays cannot be lifted unless the switches $B^1$ and $B^2$ are closed, which establishes an electrical interlock to prevent the closure of the main switch in case either or both of the switches $S^1$ and $S^2$ are in closed condition.

If the switch C is thrown from off position immediately to third position, it is readily seen that the acceleration switches $S^1$ and $S^2$ will close in proper order. Both relays $D^1$ and $D^2$ will close immediately. Then the switch S will close, and the relays will close their lower contacts in sequence as before, causing the switches $S^1$ and $S^2$ to cut out the resistances $R^1$ and $R^2$ in proper order.

I have shown the winding $H^1$ as a series coil and the winding $H^2$ as a shunt coil, but both windings may be series coils connected to receive primary or secondary current, or both may be voltage coils connected across the secondary circuit of the motor.

Referring now to Fig. 2, the parts are substantially as in Fig. 1 except such changes as the incorporation of the relay $D^3$ requires. In this figure, the switch S closes before any of the relays operate.

If the master switch $C^a$ be moved to position 1, current from the line $L^1$ flows through the switches $B^2$ and $B^1$, the contacts of the relay $D^3$, the winding $O^3$, and the fingers 4 and 5, and the strips 10 and 11 to the line $L^2$. The switch S closes causing the motor primary T to be connected to the lines $L^1$, $L^2$ and $L^3$, and the switch $B^3$ to be moved for maintaining a circuit for the winding $O^3$ when the relay $D^3$ is subsequently operated. The secondary circuit W of the motor energizes the holding windings $H^1$ and $H^2$, and the circuits of the operating windings $O^1$ and $O^2$ are closed through the contacts 19. The relays $D^1$ and $D^2$ are lifted to close their upper contacts. The operation then continues as in Fig. 1, the relay $D^3$ operates before the switches $S^1$ and $S^2$ can close. The current in the winding $O^6$ opens the operating circuit through the winding $O^3$ and operates the relay $D^3$ to close a circuit from the line $L^1$ to the finger 7, which, when the switch $C^a$ is moved to position 2, is connected through the strips 13 and 14 and the finger 8 to the wire 21 which is connected to the winding $O^1$ so as to shortcircuit the same and subsequently to energize the winding $O^4$. The relay $D^1$ closes its lower contacts when the current in the winding $H^1$ drops to a certain value, thereby connecting the winding $O^4$ in its operating circuit. When the switch $S^1$ operates it cuts out the resistances $R^1$ and moves the switch $B^1$ to connect the winding $O^5$ in its operating circuit which is completed as soon as the relay $D^2$ closes its lower contacts under the same conditions as already described for Fig. 1.

The main switch S cannot close unless both the switches $S^1$ and $S^2$ are opened and the relay $D^3$ is in its de-energized position, as shown in the drawings. The relay $D^3$ operates after the other two relays have been lifted and the switch S has closed and is held lifted through a maintaining circuit containing the resistance $E^3$. If the switch C is thrown from off position or from position 1 to position 3, the motor automatically accelerates as does the motor of Fig. 1.

Referring now to Fig. 3, I employ two main switches $S^a$ and $S^b$ so arranged and connected to the system that the opening of either of the switches opens two phases of the primary circuit of the motor, the switch $S^a$ closing first.

If the master switch $C^a$ is moved to position 1, the winding $O^3$, is energized by current flowing from the line $L^1$ through the fingers 4 and 5, the strips 10 and 11, the winding $O^3$, and the switches $B^4$, $B^1$ and $B^2$ to the line $L^2$. Current in the winding $O^3$ closes the switch $S^a$, whose member $a$ connects the line $L^1$ to the motor M, and whose member $b$ connects the member $c$ of the switch $S^b$ and to the motor M, and operates the switch $B^3$ to close a maintaining circuit for the winding $O^3$. The closing of the member $a$ connects the windings $O^1$ and $O^2$ in a circuit from line $L^1$ through the wire 17, the resistances $E^1$ and $E^2$ and the switches $B^1$ and $B^2$ to the line $L^2$. Current in the windings $O^1$ and $O^2$ operate the relays $D^1$ and $D^2$ to close their upper contacts, thereby completing the circuit for the winding $O^7$. Current in the winding $O^7$ closes the switch $S^b$, whose member $c$ connects the line $L^2$ to the motor primary T through the member $b$ of the switch $S^a$, and the line $L^3$ directly to the primary T. The operation of the member $d$ operates the switch $B^4$ to open the operating circuit for the winding $O^3$ and to close a circuit connecting the finger 7 to the line $L^2$. The windings $H^1$ and $H^2$ were energized upon the closure of the switch $S^b$. When the master switch is moved to position 2, the fingers 7 and 8 are connected by the strips 13 and 14 to the wire 21 which completes a shortcircuit around the winding $O^1$, leaving the relay $D^1$ to be controlled by the winding $H^1$. The sequence of operations are thence the same as for Figs. 1 and 2.

When the relays $D^1$ and $D^2$ drop, the winding $O^7$ remains energized through a circuit containing the resistance $E^3$.

If either of the switches $S^a$ or $S^b$ should fail to open when the switch $C^a$ is thrown to off position, the motor will be stopped by the opening of the other switch, because two phases of the primary circuit are thereby opened.

Although I have shown my invention associated with an alternating slip-ring motor, it may as to many features be applied to direct current motor systems, and to systems in which the motors are reversed.

I claim—

1. In an electric system containing a current-controlling resistance, a circuit containing the resistance, an electromagnetic switch for cutting out the resistance from the circuit, a relay for controlling the switch, a winding independent of said circuit for operating the relay and rendering said switch ineffective, a winding for holding the relay in its operated position, and means for shunting the operating winding to make the said switch effective.

2. An electric circuit, an electromagnetic controlling switch therefor, a relay controlling the winding of the switch and having contacts connectible in the circuit of the winding, a winding connected in shunt to said circuit for operating the relay to open the contacts, a winding for holding the relay in its operated position, and means for shunting the operating winding to allow the relay to close the said contacts.

3. An electric circuit, an electromagnetic controlling switch therefor, a relay controlling the winding of the switch and having contacts connectible in the circuit of the winding, a winding connected in shunt to said circuit for operating the relay to open the contacts, a winding for holding the relay in its operated position, a resistance in series with the operating winding, and means for shunting the operating winding to allow the relay to close the said contacts.

4. An electric circuit, an electromagnetic controlling switch therefor, a relay controlling the winding of the switch and having contacts connectible in the circuit of the winding, a winding for operating the relay to open the contacts, a winding for holding the relay in its operated position, a master switch having mutually engageable contacts, and connections from said contacts for shortcircuiting the operating winding when in its operative position, and for connecting the operating winding of the switch to its operating circuit when the holding winding has released the relay.

5. In an electric motor accelerating system, a motor circuit, a current-controlling resistance therefor, an electromagnetic switch for cutting out the resistance from the circuit, a relay which when operated opens the circuit of the winding and when released closes the said circuit, a winding energized from a circuit in shunt to the motor circuit for operating the relay, a winding energized by the motor current for holding the relay in its operated position, and means for shunting the operating winding, thereby putting the relay under the control of the holding winding.

6. In an induction motor accelerating system, a secondary circuit, a starting resistance therein, a normally open controlling switch therefor, a relay for controlling the switch, a pair of cumulative operating windings for the relay, one of the windings being supplied with current in the secondary circuit, and the other winding being supplied with current from the primary circuit, and means for rendering the other winding ineffective, thereby leaving the relay under the control of the former winding only.

7. In a motor accelerating system, a motor, a circuit therefor, a main switch to close the motor circuit, a second switch to control the acceleration of the motor, an electromagnetic relay to control the second switch, an operating winding therefor energized from a circuit in shunt to the motor circuit, means establishing a definite sequence in the operation of the main switch and the relay, means for establishing a short circuit around the operating winding of the relay, and means effective, after the establishment of the short circuit, for operating the second switch.

8. In a motor accelerating system, a motor, a circuit therefor, an electromagnetic acceleration switch for the circuit, an electromagnetic relay having contacts initially closed in the circuit of the winding of said switch, an operating winding therefor energized from a circuit in shunt to the motor circuit, means for operating the relay to open the contacts before the current through the winding can operate the switch, and means for shunting the operating winding of the relay to effect the closing of the said contacts.

9. In a motor control system, an induction motor, primary and secondary circuits therefor, a normally open switch for controlling the speed of the motor, a relay with initially closed contacts which when open render the switch ineffective, means controlled by the primary current for operating the relay to open the contacts before the switch can close, and means controlled by secondary current for rendering the relay effective to close the contacts.

10. In a motor controller, a motor, a circuit therefor, a speed-controlling switch for the circuit, an electromagnetic relay having initially closed contacts through which current for operating the switch passes, a master switch having contacts connectible with the winding of the relay to open the relay contacts, and having other contacts connectible with the winding to render the same ineffective for holding the contacts open.

11. In a motor controller, a speed-controlling switch, an electromagnetic relay having contacts which when open prevent the operation of the switch, and a master switch having a contact for shunting the operating winding of the relay.

12. In a motor controller, a speed-controlling switch, a relay for controlling the switch, a master switch having contacts for causing the operation of the relay, initially open contacts on the relay for connecting a second contact on the master switch to a source of current supply, and initially closed contacts on the relay for connecting the said second contact on the master switch to the operating winding of the speed-controlling switch.

13. In a motor controller, a speed-controlling switch, a relay for controlling the switch, a master switch having contacts for causing the operation of the relay, initially open contacts on the relay for connecting a second contact on the master switch to a source of current supply, initially closed contacts on the relay for connecting the said second contact on the master switch to the operating winding of the speed-controlling switch, and a contact controlled by the speed-controlling switch for opening the operating circuit of the relay.

14. In a motor controller, a speed-controlling switch, an electromagnetic relay having contacts which when open prevent the operation of the switch, and a master switch having a contact for shunting the operating winding of the relay and for energizing the operating winding of the speed-controlling switch.

15. In a motor controller, a resistance-controlling switch, an electro-responsive device having contacts which when open prevent operation of the switch, and a master switch contact which connects a shunt around the operating means of the electro-responsive device and supplies current to the operating winding of the resistance-controlling switch.

16. In a motor controller, a speed-controlling switch, an electromagnetic relay having contacts which when open prevent the operation of the switch, a master switch having a contact for shunting the operating winding of the relay, and a contact in the circuit of the operating winding opened upon closure of the speed-controlling switch.

Signed at Cleveland Heights, Ohio, this 6th day of July 1922.

JAY H. HALL.